(12) United States Patent
Leask et al.

(10) Patent No.: US 11,374,837 B2
(45) Date of Patent: *Jun. 28, 2022

(54) CATEGORIZING IP-BASED NETWORK TRAFFIC USING DNS DATA

(71) Applicant: VIAVI SOLUTIONS INC., San Jose, CA (US)

(72) Inventors: Patrick Leask, Dalgety Bay (GB); Jürgen Voss, Wiesbaden (DE); Rolf Baessler, Rudersberg (DE)

(73) Assignee: VIAVI SOLUTIONS INC., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,084

(22) Filed: Jul. 8, 2019

(65) Prior Publication Data

US 2019/0334804 A1 Oct. 31, 2019

Related U.S. Application Data

(63) Continuation of application No. 14/688,455, filed on Apr. 16, 2015, now Pat. No. 10,389,609.

(60) Provisional application No. 61/980,204, filed on Apr. 16, 2014.

(51) Int. Cl.
  *H04L 43/0876* (2022.01)
  *H04L 61/4511* (2022.01)
  *H04L 101/654* (2022.01)

(52) U.S. Cl.
  CPC ...... *H04L 43/0876* (2013.01); *H04L 61/1511* (2013.01); *H04L 61/6054* (2013.01)

(58) Field of Classification Search
  CPC ............. H04L 43/0876; H04L 61/1511; H04L 61/6018; H04W 8/18
  USPC .................................................. 709/224, 238
  See application file for complete search history.

(56) References Cited

U.S. PATENT DOCUMENTS

| | | | |
|---|---|---|---|
| 7,644,150 B1 | 1/2010 | Nucci | |
| 9,021,085 B1* | 4/2015 | Jensen | H04L 51/12 709/224 |
| 9,253,068 B1 | 2/2016 | Wu | |
| 2003/0163567 A1* | 8/2003 | McMorris | H04L 67/04 709/225 |
| 2004/0019560 A1 | 1/2004 | Evans | |
| 2004/0039798 A1* | 2/2004 | Hotz | H04L 61/1511 709/219 |
| 2007/0118668 A1* | 5/2007 | McCarthy | H04L 61/1511 709/238 |
| 2009/0088147 A1* | 4/2009 | Bu | H04W 12/12 455/423 |

(Continued)

FOREIGN PATENT DOCUMENTS

EP 2701353 A1 2/2014

*Primary Examiner* — David R Lazaro
*Assistant Examiner* — Mariegeorges A Henry
(74) *Attorney, Agent, or Firm* — Mannava & Kang, P.C.

(57) ABSTRACT

A method and system for categorizing Internet Protocol (IP) based network traffic is configured to monitor domain name system (DNS) transactions between at least one customer device and a DNS service. The DNS transactions are used to populate a data table, which is used to enrich a data record (e.g., IPDR). In particular, an IP address and/or customer ID in the data record is used to look up the corresponding domain name in the data table, which is added to the data record. The enriched data record is used to categorize the IP traffic.

20 Claims, 4 Drawing Sheets

(56) References Cited

U.S. PATENT DOCUMENTS

| | | | |
|---|---|---|---|
| 2013/0151725 A1* | 6/2013 | Baginski | H04L 61/251 709/245 |
| 2013/0215833 A1* | 8/2013 | Ong | H04W 16/06 370/329 |
| 2014/0108672 A1 | 4/2014 | Ou | |

* cited by examiner

CATEGORIZING IP-BASED NETWORK TRAFFIC USING DNS DATA

CROSS-REFERENCE TO RELATED APPLICATIONS

This application is a Continuation of commonly assigned and co-pending U.S. patent application Ser. No. 14/688,455, filed Apr. 16, 2015, which claims priority from U.S. Provisional Patent Application No. 61/980,204 filed Apr. 16, 2014, the disclosures of which are hereby incorporated by reference in their entireties.

TECHNICAL FIELD

The present application relates generally to categorizing Internet Protocol (IP)-based network traffic, and more specifically to a method and system for categorizing IP-based network traffic using domain name system (DNS) data.

BACKGROUND

Current approaches to categorizing IP network traffic typically rely on detailed analysis of the IP packet headers and contents to identify the type of traffic. For example, a Uniform Resource Locator (URL)-based categorization approach requires the Hypertext Transfer Protocol (HTTP) packet headers to be monitored, assembled, structured into fields, and then categorized using the URL field from HTTP GET transactions. Alternatively, a Deep Packet Inspection (DPI)-based approach requires a combination of packet headers, ports, and conversation signatures to be analyzed in order to determine the traffic category.

Unfortunately, both these approaches require the payload of the IP packets to be analyzed. In general, network traffic monitoring approaches that require the payload of IP packets to be analyzed have been met with concerns regarding violation of privacy. In fact, in some instances, analyzing the contents of the IP packets may result in a breach of Data Privacy regulations. For example, in some instances analyzing customer traffic Layer 5 and/or the payload may breach an individual's data privacy.

In general, where Data Privacy regulations do apply, network providers are permitted only to examine the content of data for the services they provide to their customers. Services provided by other parties (e.g. remote web services) may not be examined. Accordingly, in these instances and/or in instances where the content is encrypted, categorizing network traffic using these current approaches can be challenging.

SUMMARY

As discussed above, even when Data Privacy regulations apply, network providers are permitted to examine the content of data for the services they provide to their customers. One service commonly provided by network providers is Domain Name System (DNS) service. Since the network provider provides the DNS service, the network provider is permitted to examine the detailed contents of the DNS requests and replies. Advantageously, this DNS data includes information that may be used to categorize network traffic. For example, in one embodiment of the present disclosure this DNS data is used to classify IP communications network traffic.

In accordance with one aspect of the present disclosure there is provided a method of categorizing Internet Protocol (IP) network traffic comprising: monitoring domain name system (DNS) transactions between at least one customer device and a DNS service; creating a data table using data extracted from the DNS transactions, the data table including a domain name field, an IP address field, and at least one of a customer ID field and a device ID field; obtaining a data record for IP traffic between the at least one customer device and a remote service, the data record including an IP address for the remote service; enriching the data record with a domain name corresponding to the IP address of the remote service, the domain name corresponding to the IP address of the remote service obtained from the data table using the IP address of the remote service and at least one of a customer ID and a device ID; and categorizing the IP traffic using the enriched data record.

In accordance with another aspect of the present disclosure there is provided a system for categorizing Internet Protocol (IP) network traffic comprising: at least one customer device; a remote service in network communication with the at least one customer device; a domain name system (DNS) service for receiving DNS requests from the at least one customer device and for returning DNS responses to the at least one customer device; at least one monitor for monitoring DNS transactions between the at least one customer device and the DNS service and transactions between the at least one customer device and the remote service, the at least one monitor for extracting data from the DNS transactions, the extracted data for populating a data table including a domain name field, an IP address field, and at least one of a customer ID field and a device ID field, the at least one monitor for providing a data record for IP traffic between the at least one customer device and the remote service, the data record including an IP address for the remote service; a processor for enriching the data record with a domain name corresponding to the IP address of the remote service, the domain name corresponding to the IP address of the remote service obtained from the data table using the IP address of the remote service and at least one of a customer ID and a device ID; and a traffic analyzer for categorizing the IP traffic using the enriched data record.

BRIEF DESCRIPTION OF THE DRAWINGS

Exemplary embodiments of the present disclosure will now be described in conjunction with the drawings in which.

It will be noted that throughout the appended drawings, like features are identified by like reference numerals.

DETAILED DESCRIPTION

Domain Name System (DNS) service is a service that network providers deliver to their customers to enable customers to access all IP-based services. For example, to access the BBC News website using a browser, the customer's device (e.g., desktop, laptop, phone, tablet, tv, etc.) will send a DNS request to the network provider's DNS service.

The DNS request, which includes the Domain Name "news­.bbc.co.uk", will result in the DNS service sending a return response including the IP address corresponding to the web server hosting the news.bbc.co.uk domain. The customer's device will then use the IP address provided in the DNS reply to access the web page.

Figure 1:
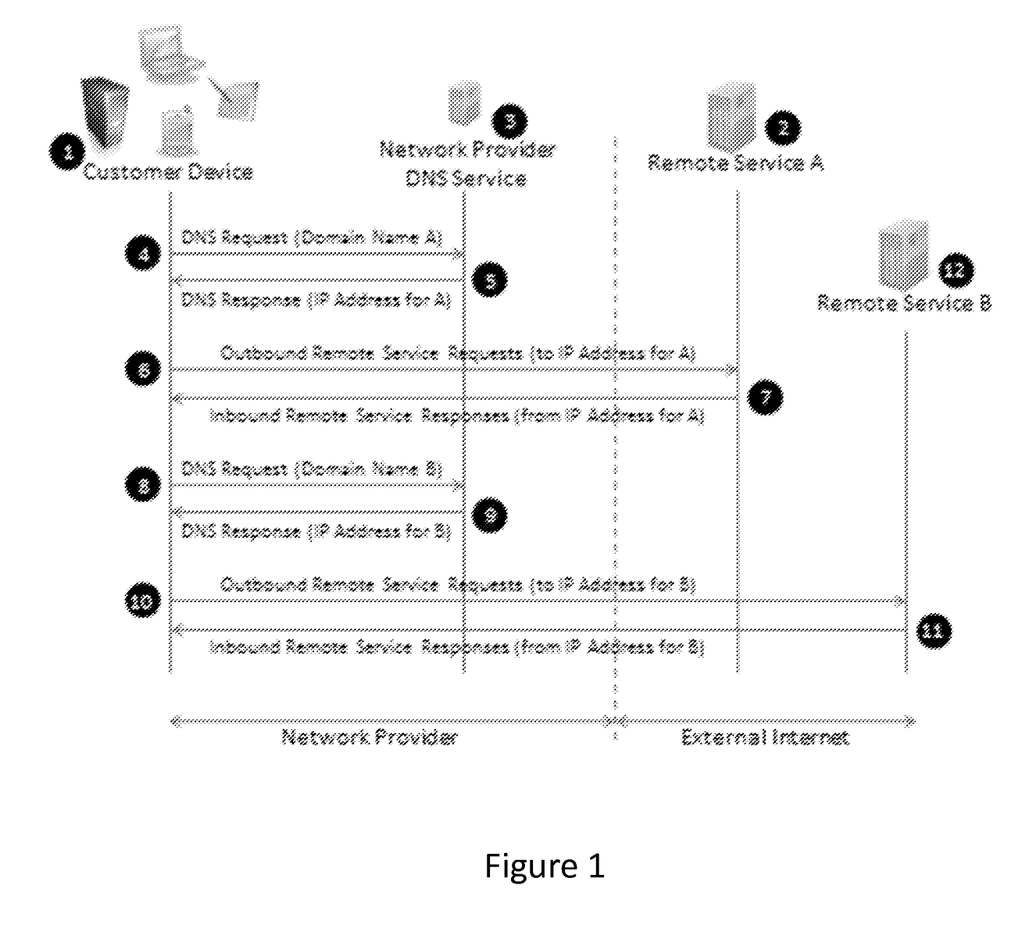
FIG. 1 is schematic diagram of system including a DNS service.

Referring to FIG. 1, there is shown a schematic diagram of a system including a DNS service. More specifically, FIG. 1 shows an IP communications network that includes a customer device 1 in communication with a remote service 2 via the internet. The network provider, which has a DNS service 3, receives a DNS request 4 from the customer device 1 and sends a return DNS response 5 back to the customer device. For example, in one embodiment the DNS request will include the Domain Name for a predetermined website, whereas the DNS response will include the IP address for the web server hosting that Domain Name. The customer device 2 is then able to send an outbound remote service request 6 to the IP address of the web server, thus allowing the customer device to load a page from said website 7. Similarly, the client device 1 is able to connect to another remote service 12 by sending a DNS request 8 to the DNS service 3, receiving the DNS reply 9, sending an outbound remote service request 10 to the remote service 12, and receiving an inbound remote service response 11 from the remote service 12.

In general, IP-based customer data traffic (i.e., known as user-plane data) may be monitored at selected points within the IP communications network. For example, in one embodiment monitoring points are established to ensure all IP-based customer data traffic between the customer devices and selected services can be monitored (e.g., referring to FIG. 1, monitoring points may be provided between customer device 1 and DNS service 3 and/or between customer device 1 and remote service 2). In one embodiment, the monitoring points are selected such that monitors include probes and/or monitors integrated into the network access equipment. For example, in one embodiment the monitor may be integrated into an existing router or switch. In one embodiment, monitors are provided at one or more nodes within the network. In one embodiment, the monitors (e.g., probes and/or network equipment) capture IP packets from the network in order to provide and/or inspect the user-plane data. The data captured by the monitors may be analyzed to determine the source and/or destination of the traffic and/or sources of traffic congestion.

In one embodiment, the user-plane data captured by the monitors is identified and summarized in a data record such as an Internet Protocol Detail Record (IPDR). An IPDR, which may be generated by the monitors and/or from data obtained by the monitors, provides information about IP-based service usage and/or service activity (e.g., for voice and/or data traffic). For example, conventional IPDRs may include a time stamp, a device ID, total traffic usage, network destination, time of day or device location. In general, the content and/or format of an IPDR may be determined by the network provider and/or application. For example, IPDR formats for Cisco's NetFlow and IP Flow Information Expert (IPFIX) applications may differ. In general, the format of conventional IPDRs focus on providing a stream of records for downstream analysis using the IP address.

Although IPDRs may be used to collect and record data traffic statistics produced on a network, they conventionally lack the data required for traffic classification. Traffic classification is a process that categorizes IP network traffic as belonging to different class (e.g., which may correspond to different applications or protocols), and thus may improve network performance. For example, IP traffic (e.g., data packets) may be categorized into separate classes used to meet accounting, regulatory, Quality of Service (QoS), and/or other requirements. Classifying IP traffic may allow the network provider to provide services such as website filtering, content filtering, controlling application resource usage, data loss prevention (DLP), anti-spam processing, and/or malicious software identification. Traditional approaches to categorizing IP network traffic may include port-based techniques, payload based techniques, and statistical classification. Although relatively slow and expensive, the current approaches for categorizing IP network traffic typically use a payload-based technique (e.g., the URL and DPI approaches discussed above). Accordingly, these current approaches may breach data privacy regulations.

In accordance with one embodiment of the present disclosure, IP network traffic is categorized using user-plane information obtained from DNS transactions (e.g., service requests and/or DNS service responses). In another embodiment, the IP network traffic is categorized using user-plane information obtained from the DNS transactions (e.g., service requests and/or DNS service responses) and subsequently transferred IP-based data. As described above, since network providers typically provide the DNS service, the network provider is permitted to examine the detailed contents of the DNS requests and responses. For example, the DNS requests and/or responses may include IP addresses used by the customer devices to access remote services and used by the remote services to send data back to customer devices. Since the network provider needs to examine and use these IP addresses to route both outbound and inbound data traffic, the provider is permitted to examine and/or analyze this data without violating customer privacy. Accordingly, the customer traffic may be analyzed and/or categorized without breaching Data Privacy regulations and without using the relatively expensive DPI-based categorization technologies.

In one embodiment, the IP network traffic is monitored at select points. For example, in one embodiment where the network is a mobile network the selected points may correspond to gateway General Packet Radio Service (GPRS) support nodes (GGSNs). In another embodiment, the selected points correspond to an interface between a Long-Term Evolution (LTE) network and packet data network. For example, in one embodiment, the IP network traffic is monitored at the Packet Data Network Gateway (PGW). In one embodiment monitoring points are established to ensure all user-plane data traffic between the customer devices and selected services can be monitored (e.g., referring to FIG. 1, monitoring points may be provided between customer device 1 and DNS service 3 and/or between customer device 1 and remote service 2). In one embodiment, the monitoring points are selected such that the monitors include stand-alone probes and/or monitors integrated into the network access equipment (e.g., routers or switches). For example, in one embodiment the monitors collect IP network traffic as it enters or exits an interface.

In one embodiment, the user-plane data obtained from the DNS transactions is identified and summarized in a data record (e.g., IPDR), which is used (e.g., directly or indirectly) to perform the categorization and thus permit analysis of the network provider's customer traffic. The data record, which may be generated either by the monitoring probes or by the network equipment itself, may provide information about IP-based service usage and/or service activity.

In one embodiment, two types of data records are used for the categorization, namely a first data record (e.g., IPDR) referred to as a DNS Request/Response Record or simply a DNS record, which is generated for each DNS request and response pair initiated by customer devices, and a second data record (e.g., IPDR), which is used for all other IP-based communications from and to the customer device(s).

Figure 2:
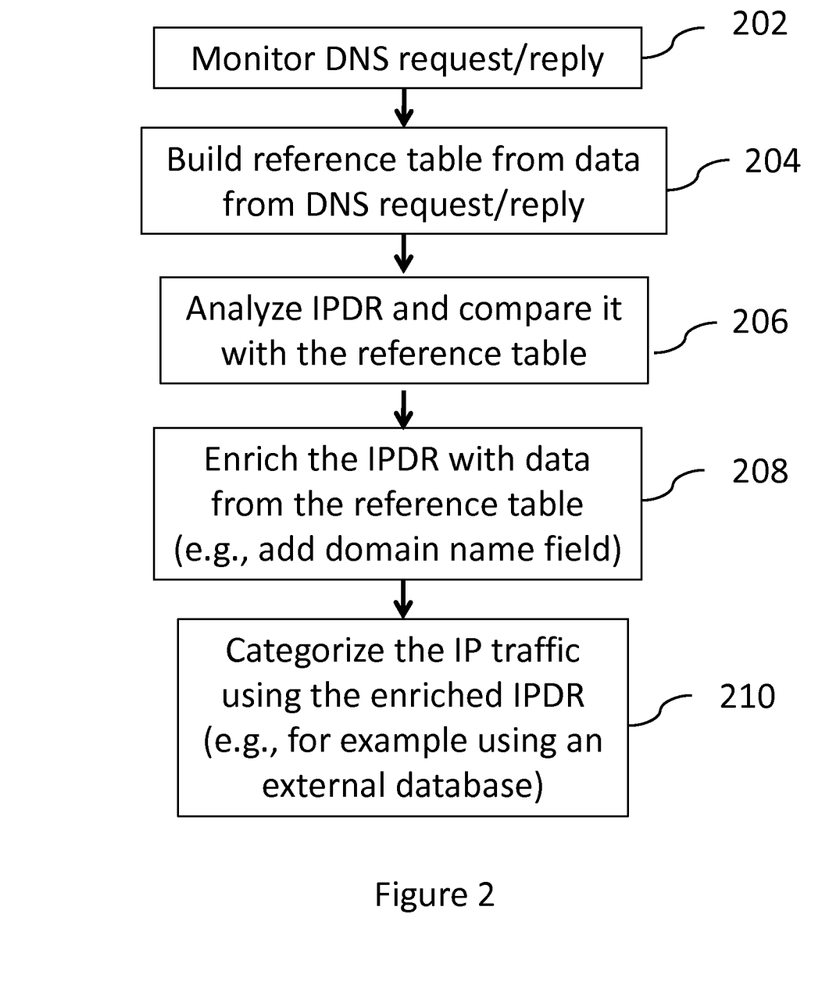
FIG. 2 is a flow diagram of a method for categorizing network traffic in accordance with one embodiment of the present disclosure.

Referring to FIG. 2, there is shown a flow diagram of a method of traffic categorization, in accordance with one embodiment of the present disclosure. The method begins at step 202, where a monitor (e.g., a probe or existing network equipment) extracts a Domain Name from a DNS request and the corresponding IP address from the corresponding DNS reply. The Domain Name and IP addresses are mapped with the Customer ID/Device ID.

At step 204 a reference data table is built using a batch of DNS records, including the record obtained from step 202. For example, in one embodiment, the reference table includes a Customer ID, IP Address, and Domain Name, where the data in each row in the table is taken from a single DNS transaction, as shown in Table 2.

TABLE 1

Reference Data Table for Dynamic Method

| Customer ID | IP Address | Domain Name |
| --- | --- | --- |
| 12345678 | 108.161.189.192 | cdn.jquerytools.org |
| 19879732 | 108.161.189.192 | cdn.visualnews.com |
| 40982783 | 108.161.189.192 | static.med-kolleg.de |

In one embodiment, this method is referred to as a Dynamic Method of traffic categorization because the reference data table is built and/or updated in real time (e.g., as the Customer Devices are constantly issuing DNS queries and then immediately interacting with the remote services). In one embodiment, the reference data table is referred to as a dynamic enrichment table since it may be used to enrich other data records (e.g., flow-based or time-based user-plane records).

In step 206, the dynamic enrichment table is used to process another data record corresponding to the traffic to be categorized (e.g., IPDR). For example, in one embodiment the Customer/Device ID and IP Address of the Remote Service is used to lookup the dynamic enrichment table and determine the corresponding Domain Name. For example, if a data record (e.g., IPDR) contains the Customer ID "19879732" and the Remote Service IP Address "108.161.189.192", then the corresponding Domain Name from the dynamic enrichment table will be "cdn.visualnews.com".

In one embodiment the user-plane records to be processed (e.g., the IPDR) are generated using the same monitor used to obtain the DNS data. In another embodiment, the user-plane records to be processed (e.g., the IPDR) are generated using a separate monitor. For example, in one embodiment the user-plane record to be processed (e.g., the IPDR) is obtained from a monitor used to provide network flow analysis (e.g., such as commercially available NetFlow or IPFIX).

In step 208, the Domain Name is used to enrich the user-plane record to be processed (e.g., the IPDR) by adding a Domain Name (e.g., add the value "www.youtube.com") to a Domain Name field in the data record (e.g., IPDR) to provide an enriched data record (e.g., an enriched IPDR).

In step 210, the Domain Name (e.g., in the enriched IPDR) is used to categorize the traffic. For example, in one embodiment, the Domain Name in the enriched IPDR is compared with a database (e.g., a list of service categories mapped to different Domain Names) to determine a category corresponding to the Domain name. In one embodiment, the Domain Name is used with a service that provides a content category or type for a given domain.

Advantageously, this dynamic approach (i.e., wherein the reference table is built in real time) allows the Domain Name requested by each Customer Device to be immediately available in the dynamic enrichment table, and thus be matched with the corresponding IP address in other user-plane records (e.g., IPDRs).

Further advantageously, this dynamic approach accounts for scenarios where multiple Domain Names for Remote Services match onto the same IP Address (e.g., as shown in Table 1). For example, if the Customer ID/Device ID was not used, then all IPDRs containing the IP address "108.161.189.192" might be enriched with the same domain (e.g. cdn.jquerytools.org). Using the Customer ID/Device ID ensures the correct Domain Name is used to enrich the user-plane record (e.g., the IPDR), and thus reduces the possibility that the data record (e.g., the IPDR) would be enriched with an incorrect Domain Name.

In fact, in practice, it is common for multiple Domain Names to be mapped onto a single IP address (e.g., multiple web sites hosted by a single server belonging to an Internet Service Provider (ISP) or hosting company or Content Delivery Network (CDN)). If a customer/device identifier is not provided in the reference data table, then the lookup of the IP address without the customer/device ID may return any of the domains that are hosted by that IP address. Notably, conventional reverse DNS lookup only uses the IP address and does not use a customer/device ID. Using the customer/device identifier allows the exact Domain Name accessed with the original DNS request from that individual customer/device to be returned, and is thus more accurate.

In general, the Customer ID/Device ID may be any unique identifier that identifies the customer and/or the device. In one embodiment, the Customer ID/Device ID is a Customer ID. For example, in one embodiment the customer ID is an International Mobile Subscriber Identity (IMSI) number used to identify the user of a cellular network. In another embodiment, the Customer or Device ID is a Device ID. For example, in one embodiment the Device ID is an International Mobile Station Equipment Identity (IMEI) number used to identify a mobile phone. In another embodiment, the Customer ID/Device ID includes the IP address from which the DNS request originated. In one embodiment, the Customer ID/Device ID is obtained from the protocol stack.

Notably, data records (e.g., IPDRs) generated for conventional traffic flow monitoring (e.g., NetFlow, IPFIX, etc) are focused on providing a stream of records for downstream analysis and do not identify the Domain Name matching the IP address provided therein. More specifically, conventional traffic flow monitoring does not typically identify the Domain Name matching the IP address.

In one embodiment, the monitor in 202 monitors the network traffic at select points. For example, in one embodiment where the network is a mobile network the selected points may correspond to gateway GPRS support nodes (GGSNs). In another embodiment, the selected points correspond to an interface between a Long-Term Evolution (LTE) network and another packet data network. For example, in one embodiment, the IP network traffic is monitored at the Packet Data Network Gateway (PGW). In one embodiment, the monitoring points are established to ensure all user-plane data traffic between the customer devices and selected services can be monitored (e.g., referring to FIG. 1, monitoring points may be provided between customer device 1 and DNS service 3 and/or between customer device 1 and remote service 2). In one embodiment, the monitoring points are selected such that each monitor includes a stand-alone probe and/or a monitor integrated into the network access equipment. In general, the monitor in 202 may be implemented in software or provided in hardware. For example, since the DNS data records and non-DNS data records may comply with IPDR protocols and since IPDRs are typically obtained using a software-based data collection method, in many embodiments, the monitors in 202 and 206 will be software-based monitors.

In one embodiment, the monitor in 202 generates the following parameters from the DNS transactions:
 a) Customer or Device ID
 b) Domain Name (one or more)
 c) IP Address (one or more)

In one embodiment, the user-plane record (e.g., the IPDR) in 206 is generated from data obtained by the monitor in 202 or using a separate monitor. For example, in one embodiment the data record (e.g., the IPDR) is generated using one of the monitors commercially available for traffic flow monitoring (e.g., NetFlow, IPFIX, etc). In one embodiment, the user-plane record (e.g., the IPDR) in 206 is generated using a monitoring system that generates the following parameters:
 a) Customer ID
 b) IP Address of Remote Service
 c) Data Volume (outbound and inbound)
 d) Service Status
 e) QoS Parameters (e.g. initial response time, round-trip-time, retransmission rate, service termination status, etc.)

Advantageously, the reference table generated in 202 and the user-plane record (e.g., the IPDR) used in 206 may be obtained without examining the contents of IP packets (e.g., without DPI), and thus can be used to categorize the traffic in instances wherein the content is encrypted. In particular, this Dynamic DNS enrichment approach permits the DNS queries and responses contained within the user-plane traffic to be monitored, and to be used to build a dynamic enrichment table that may be used to enrich flow-based or time-based user-plane records. Notably, this approach may be referred to as "Dynamic" because the enrichment table is constantly updated (e.g., as new DNS requests and responses are received), and because the enrichment table is constantly referenced (e.g., when user-plane records are generated).

Figure 3:
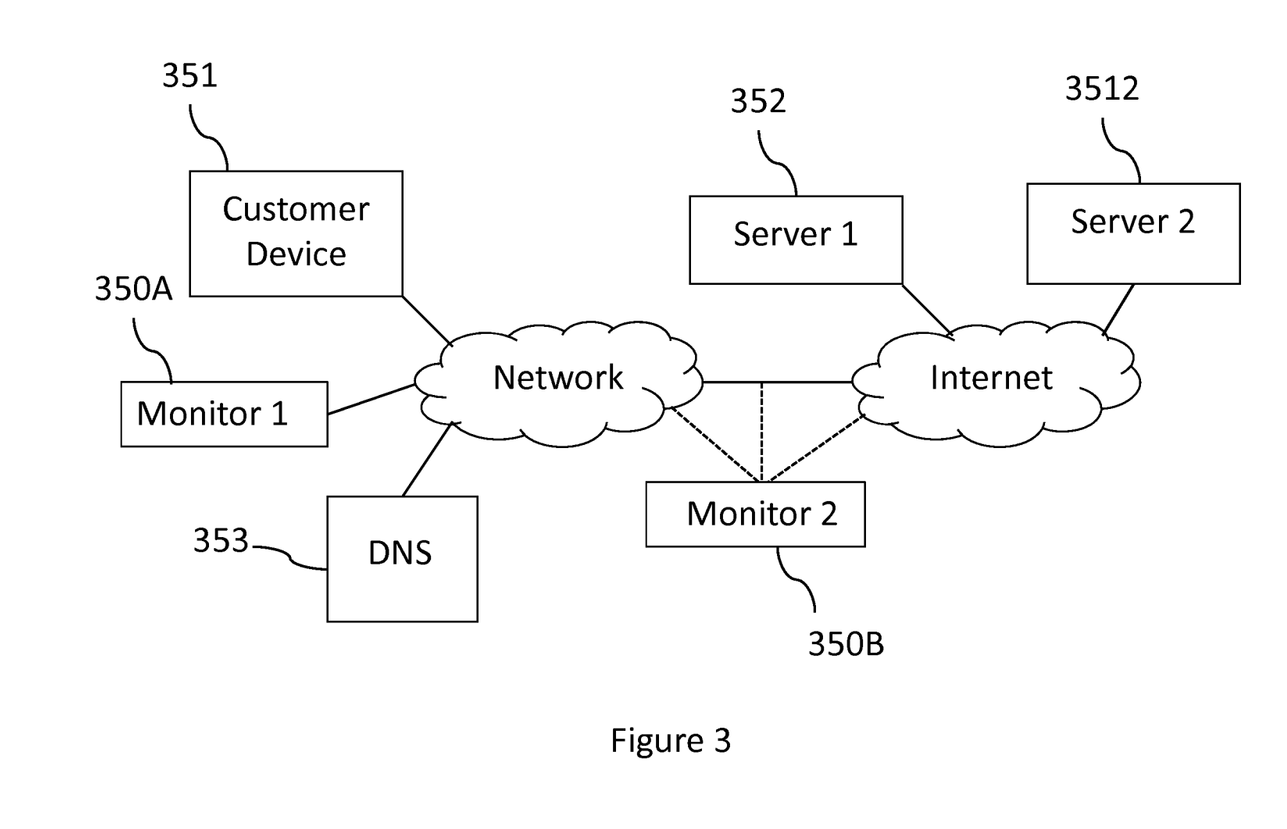
FIG. 3 is a schematic diagram of a system for categorizing network traffic in accordance with an embodiment of the present disclosure.

Referring to FIG. 3, there is shown a system in accordance with one embodiment of the present disclosure. The system includes an IP communications network that has at least one customer device 351 in communication with a remote server 352 and a DNS server 353. The DNS service 353, which is provided by the network provider, receives a DNS request from the customer device 351 and sends a return DNS response back to the customer device 351. For example, in one embodiment the DNS request will include the Domain Name for a predetermined website, whereas the DNS response will include the IP address for the server hosting that Domain Name. The customer device 351 is then able to send an outbound remote service request to the IP address of the server 352, thus allowing the customer device to load a page from a website hosted by the server 352. Similarly, the client device 351 is able to connect to another remote service 3512 by sending a DNS request to the DNS service 353, receiving the DNS reply, sending an outbound remote service request to the remote service 3512, and receiving an inbound remote service response from the remote service 3512.

A first monitor 350A monitors IP-based customer data traffic (i.e., known as user-plane data) and more specifically monitors DNS transactions (e.g., requests and responses). In one embodiment, the data records obtained from monitoring the DNS transactions are used to build (e.g., create, populate, and/or update) a reference data table. For example, in one embodiment the data records are used to build a dynamic enrichment table (e.g., that includes the customer or device ID, IP address, and Domain Name as fields). More specifically, each DNS Request and corresponding Response is used to populate the dynamic enrichment table (e.g., which is constantly updated as new DNS data records are received).

Referring to FIG. 3 the first monitor 350A is disposed within the IP-based communications network between the DNS service and the customer device. In one embodiment, the first monitor 350A is disposed at a node in the network, which may include one or more wired and/or wireless networks, that transmits traffic (e.g., IP packets). For example, in one embodiment, the monitor may include or be integrated in a modem, a router, a switch, a multiplexor, a firewall and/or a cable modem termination system (CMTS). In one embodiment, the monitor includes a digital device or an optical device. In one embodiment, the monitor is implemented in software or hardware. In one embodiment, the monitor and/or node includes an internal or external storage device and/or a processor. In one embodiment, the monitor may receive, process, and/or transmit IP packets and may generate, process, and/or transmit data records (e.g., user-plane data records including the DNS enrichment table).

In one embodiment, the type of DNS requests (e.g., also termed DNS Queries) that are monitored by monitor 350A include "A" Requests (IPv4 address record) and/or "AAAA" Requests (IPv6 address record). In one embodiment, the type of DNS requests that are monitored by monitor 350A include Recursive queries, where the response (Positive or Authoritative) is a Host Record, and/or Iterative queries, where the response (Positive or Authoritative) is a Host record.

In one embodiment, the DNS responses (e.g., also termed DNS Replies) that are monitored by monitor 350A include the IP address of the remote service. In one embodiment, the monitor 350A ignores Resource Record types of responses such as Name Server (NS) records, Alias or Canonical Name record (CNAME) records (e.g., sent in Referral responses), Reverse-lookup (e.g., PTR) records, Mail exchange (MX) records, Service (SRV) records, Incremental zone transfer (IXFR) records, and Standard zone transfer (AXFR) records.

In one embodiment, the first monitor 350A extracts and/or uses at least some of the following fields from the DNS transactions:
 a) Transaction ID (e.g., used to match requests to responses, as a single client may initiate multiple DNS requests in parallel)
 b) Fully Qualified Domain Name (FQDN)(e.g., which may also be referred to as the Question Name)
 c) Question Resource Record Count (e.g., the number of DNS Questions)
 d) Answer Resource Record Count (e.g., the number of DNS Answers)
 e) Time-to-Live (TTL) (e.g., which defines how many seconds the Answer is valid for)

Notably, since each DNS request may include multiple Questions, each Question and Response may be parsed to obtain each FQDN and matching IP address pair.

In one embodiment, the data records extracted by the first monitor 350A are used to update the dynamic enrichment table. For example, in one embodiment, the dynamic enrichment table is structured to include a Customer ID column (e.g., for IMSI data), a Domain Name column (e.g., for FQDN from DNS questions), an IP Address column (e.g., for matching IP address from DNS answers), a Timestamp column (e.g., for the date/time of the DNS response), and a Time-to-Live (TTL) column (e.g., which specifies how many seconds the entry should remain in the Enrichment Table, measured in elapsed time after the DNS response timestamp).

In one embodiment, the dynamic enrichment table entries may expire (e.g., as defined by data in the TTL column). For example, in one embodiment, the enrichment table will be purged of "stale" entries. In one embodiment, the "stale" entries will be purged periodically (e.g., at a fixed or random frequency). In another embodiment, the "stale" entries will be purged in dependence upon a trigger mechanism. In general, a "stale" entry may refer to an entry where the current timestamp is greater than the Expiry Time as defined in Eq. 1:

$$\text{Expiry Time} = \text{DNS Response Timestamp} + \text{TTL} \quad (1)$$

In one embodiment, a primary key into the dynamic enrichment data table is provided, which includes a combination/concatenation of the Customer ID and the IP Address. The primary key enables a hash-table method to be used for populating and maintaining the enrichment table.

In one embodiment, the first monitor 350A provides and/or updates the dynamic enrichment data table. In another embodiment, the data records extracted by the first monitor 350A are transmitted to another device that updates the dynamic enrichment table.

The second monitor 350B also monitors IP-based customer data traffic (i.e., known as user-plane data) and more specifically may extract and/or provide data to generate non-DNS data records (e.g., IPDRs or other data records not derived from the DNS transactions).

In one embodiment, the second monitor 350B is disposed in the network or external internet. For example, in one embodiment the second monitor 350B is disposed to monitor transport of all IP packets from the network to the external internet.

In one embodiment, the second monitor 350B is disposed at a node of the network or external internet (e.g., which transmits traffic). For example, in one embodiment, the second monitor 350B may include a modem, a router, a switch, a multiplexor, a firewall, and/or a CMTS. In one embodiment, the monitor 350B includes a digital device or an optical device. In one embodiment, the monitor 350B may receive, process, and/or transmit packets and/or may generate, process, and/or transmit data records (e.g., non-DNS records).

In one embodiment, the second monitor 350B includes or is in communication with a device having a processor and storage (e.g., an aggregator device that performs data collection and data analysis) for processing and/or storing at least the user-plane records (e.g., DNS and/or non-DNS data records).

In one embodiment, the data records are processed as follows. First, the Server IP Address found in the non-DNS user-plane record (e.g., IP address of the remote service the subscriber/device has connected to) is used to lookup the dynamic enrichment table. Second, the combination/concatenation of Customer ID and IP Address is used to index into the dynamic enrichment table. If multiple matching entries are found the newest entry is used. Third, the lookup returns the matching Domain Name (e.g., the FQDN) from the dynamic enrichment data table. Fourth, the non-DNS user-plane data record is enriched with the Domain Name. Finally, the completed (i.e., enriched) user-plane record is categorized (e.g., either immediately or later as part of downstream record processing).

In another embodiment, the data records are processed as follows. First, the Server IP Address found in the non-DNS user-plane record (e.g., IP address of the remote service the subscriber/device has connected to) is used to index into the dynamic enrichment table (e.g., find the combination/concatenation of Customer ID and IP Address). If multiple matching entries are found the newest entry is used. Second, the lookup returns the matching Domain Name (e.g., the FQDN) from the dynamic enrichment data table. Third, the non-DNS user-plane data record is enriched with the Domain Name. Finally, the completed (i.e., enriched) user-plane record is categorized (e.g., either immediately or later as part of downstream record processing).

In one embodiment, the first 350A and/or second 350B monitors are in communication with a collector (not shown), which receives the data records data exported from the first 350A and second 350B monitors (e.g., performs data collection). In one embodiment, the collector includes or is in communication with a processor and storage. In one embodiment, the collector receives the data records exported from the first 350A and second 350B monitors, while the processor processes the data records.

In one embodiment, the collector (not shown) is an aggregator device that performs data collection and data analysis. For example, in one embodiment, the collector receives the data records from the first 350A and second 350B monitors, updates and stores the dynamic enrichment table, provides the enriched data record, and categorizes the traffic.

In one embodiment, the collector (not shown) is an aggregator device that performs data collection and some pre-processing and that is in communication with a downstream data analyzer. For example, in one embodiment, the collector receives the data records from the first 350A and second 350B monitors, updates and stores the dynamic enrichment table, and provides the enriched data record that is exported to the data analyzer for traffic analysis and/or categorization. In one embodiment, the data analyzer includes an interface for receiving administrator input.

Figure 4:
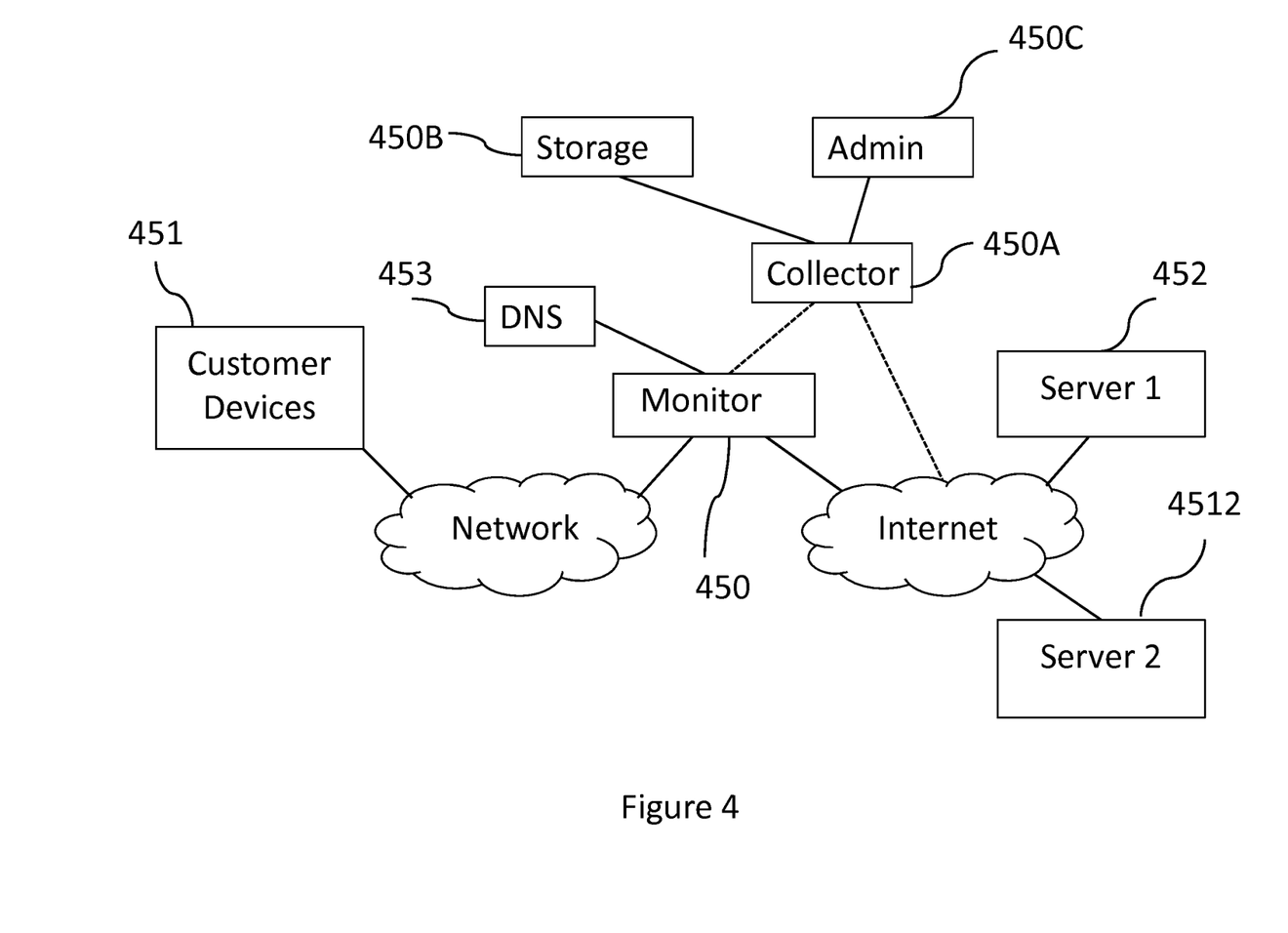
FIG. 4 is a schematic diagram of a system for categorizing network traffic in accordance with another embodiment of the present disclosure.

Referring to FIG. 4, there is shown a system in accordance with one embodiment of the present disclosure. The system includes an IP communications network that includes at least one customer device 451 in communication with a remote server 452 and a DNS server 453. The DNS server 453, which is provided by the network provider, receives a DNS request from the customer device 451 and sends a return DNS response back to the customer device 451. For example, in one embodiment the DNS request will include the Domain Name for a predetermined website, whereas the DNS response will include the IP address for the server hosting that Domain Name. The customer device 451 is then able to send an outbound remote service request to the IP address of the server 452, thus allowing the customer device to load a page from a website hosted by the server 452. Similarly, the client device 451 is able to connect to another remote server 4512 by sending a DNS request to the DNS server 453, receiving the DNS reply, sending an outbound remote service request to the remote server 4512, and receiving an inbound remote service response from the remote server.

The monitor 450 monitors IP-based customer data traffic (i.e., known as user-plane data) and in particular monitors DNS transactions (e.g., requests and responses). In one embodiment, the data obtained from monitoring the DNS transactions is used to build a reference data table. For example, in one embodiment, data is extracted from the DNS transactions and used to populate a reference data table. In one embodiment the DNS data is used to build a DNS enrichment table. More specifically, each DNS Request and corresponding Response is used to populate the DNS enrichment table, which is referred to as a dynamic enrichment table since it is constantly updated as new DNS transactions are received.

In one embodiment, the type of DNS requests (e.g., also termed DNS Queries) that are monitored by monitor 450 include "A" Requests (IPv4 address record) and/or "AAAA" Requests (IPv6 address record). In one embodiment, the type of DNS requests that are monitored by monitor 450 include Recursive queries, where the response (Positive or Authoritative) is a Host Record, and/or Iterative queries, where the response (Positive or Authoritative) is a Host record.

In one embodiment, the DNS responses (e.g., also termed DNS Replies) that are monitored by monitor 450 include the IP address of the remote service. In one embodiment, the monitor 450 ignores Resource Record types of responses such as Name Server (NS) records, Alias or Canonical Name record (CNAME) records (e.g., sent in Referral responses), Reverse-lookup (e.g., PTR) records, Mail exchange (MX) records, Service (SRV) records, Incremental zone transfer (IXFR) records, and Standard zone transfer (AXFR) records.

In one embodiment, the monitor 450 extracts and/or uses at least some of the following fields from the DNS transactions:
 f) Transaction ID (e.g., used to match requests to responses, as a single client may initiate multiple DNS requests in parallel)
 g) Fully Qualified Domain Name (FQDN)(e.g., which may also be referred to as the Question Name)
 h) Question Resource Record Count (e.g., the number of DNS Questions)
 i) Answer Resource Record Count (e.g., the number of DNS Answers)
 j) Time-to-Live (TTL) (e.g., which defines how many seconds the Answer is valid for)

Notably, since each DNS request may include multiple Questions, each Question and Response may be parsed to obtain each FQDN and matching IP address pair.

In one embodiment, the data extracted by monitoring the DNS transactions is used to update the dynamic enrichment table. For example, in one embodiment, the enrichment table is structured to include a Customer ID column (e.g., for IMSI data), a Domain Name column (e.g., for FQDN from DNS questions), an IP Address column (e.g., for matching IP address from DNS answers), a Timestamp column (e.g., for the date/time of the DNS response), and a Time-to-Live (TTL) column (e.g., which specifies how many seconds the entry should remain in the Enrichment Table, measured in elapsed time after the DNS response timestamp).

In one embodiment, the dynamic enrichment table entries may expire (e.g., as defined by data in the TTL column). For example, in one embodiment, the enrichment table will be purged of "stale" entries. In one embodiment, the "stale" entries will be purged periodically (e.g., at a fixed or random frequency). In another embodiment, the "stale" entries will be purged in dependence upon a trigger mechanism.

In one embodiment, a primary key into the dynamic enrichment data table is provided, which includes a combination/concatenation of the Customer ID and the IP Address. The primary key enables a hash-table method to be used for populating and maintaining the dynamic enrichment table.

In addition to monitoring DNS-based user-plane data, the monitor 450 also monitors non-DNS IP-based customer data traffic and more specifically may extract and/or provide data to generate non-DNS records (e.g., IPDRs or other data records not derived from DNS transactions).

Referring again to FIG. 4 the monitor 450 is disposed within the network or external internet. For example, in one embodiment, monitor 450 is disposed within the IP-based communications network between the DNS service and the customer device, and to monitor transport of all IP packets from the network to the external internet. In one embodiment the monitor is disposed at a node in the network, which may include one or more wired and/or wireless networks, that transmits traffic (e.g., IP packets). In one embodiment, the monitor may include or be integrated into a modem, a router, a switch, a multiplexor, a firewall, and/or a CMTS. In one embodiment, the monitor includes a digital device or an optical device.

The monitor 450 and/or node may include and/or be in communication with a collector 450A that includes or is in communication with a storage device 450B. The collector 450A may include a processor for processing the DNS and non-DNS user-plane data. For example, in one embodiment, the monitor 450 monitors the IP traffic and exports the extracted data records (e.g., DNS and non-DNS data records, which may include the dynamic enrichment table) to the collector 450A. The collector 450A (e.g., an aggregator device) receives the data records and then may preprocess, process, and/or store the data records (e.g., provides the enriched user-plane records). These enriched data records may then be processed and/or categorized (e.g., with or without administrator 450C input/interaction) either by the collector 450A and/or by another downstream record processor (not shown).

In each of the above described embodiments, the non-DNS user-plane records may be processed as follows. First, the Server IP Address found in the non-DNS user-plane record (e.g., IP address of the remote service the subscriber/device has connected to) is used to lookup the dynamic enrichment table. Second, the combination/concatenation of Customer ID and IP Address is used to index into the dynamic enrichment table. If multiple matching entries are found the newest entry is used. Third, the lookup returns the matching Domain Name (e.g., the FQDN) from the dynamic enrichment data table. Fourth, the non-DNS user-plane data record is enriched with the Domain Name. Finally, the completed (i.e., enriched) user-plane record is categorized (e.g., either immediately or later as part of downstream record processing).

Alternatively, non-DNS user-plane data records may be processed as follows. First, the Server IP Address found in the non-DNS user-plane record (e.g., IP address of the remote service the subscriber/device has connected to) is used to index into the dynamic enrichment table (e.g., find the combination/concatenation of Customer ID and IP Address). If multiple matching entries are found the newest entry is used. Second, the lookup returns the matching Domain Name (e.g., the FQDN) from the dynamic enrichment data table. Third, the non-DNS user-plane data record is enriched with the Domain Name. Finally, the completed (i.e., enriched) user-plane record is categorized (e.g., either immediately or later as part of downstream record processing).

There are various types of categorization that may be used to categorize the enriched user-plane records. For example, in one embodiment of the present disclosure, an enriched data record is categorized using Service Category.

Service Category may be defined as the type of service delivered by the remote server to the customer/device. The category is obtained by looking up the Domain Name in a database of service categories (e.g., which in one embodiment includes a plurality of domain names and corresponding service categories). For example, the Domain Name www.facebook.com may map onto the category "Social Networking".

In one embodiment, the database of service categories includes domain names and the corresponding service categories. For example, in one embodiment the database of service categories is based on a commercially available database, such as ZveloDB, provided by Zvelo Inc. In one embodiment, each Domain Name is mapped to a single category. In another embodiment, each Domain Name is mapped to multiple categories. In one embodiment, some of the multiple categories are weighted differently in order to indicate relevance and/or priority. In one embodiment, the number of multiple categories is reduced using a many-to-one mapping table. For example, the categories "Instant Messenger", "Chat" and "Social Networking" may all map onto a single meta-category "Social Networking". In one embodiment, the weighting and reduction of multiple categories is an admin-configurable option.

Advantageously, this type of service categorization may be used with DNS-based user-plane data records to categorize traffic. For example, in one embodiment of the present disclosure, a database of service categories is compared with a Domain Name obtained from the DNS-based user-plane record (e.g., either directly or indirectly via an enriched user-plane record) to categorize a type of service provided by the remote service.

In each of the above described embodiments, the traffic categorization may be used to classify a single packet and/or to classify traffic flow (e.g., a number of packets observed in a specific timeslot). For example, in one embodiment, the traffic analyzer receives streams of enriched data records from the collector and compiles a list of categorized IP traffic specific time periods.

Advantageously, this type of approach, wherein DNS records are used to build reference data tables which may then be used to enrich subsequent IPDRs, enables analysis of domain or content category, thus providing customer insight. More specifically, it may provide visibility into the types of activities undertaken by users on an IP communications network without using DPI-based categorization technologies.

In fact, although DPI has been proven a useful tool for policy enforcement, IPDR is often more efficient and cost-effective for various other network management tasks. Accordingly, using IPDR instead of DPI for traffic categorization may have some advantages. For example, if DPI is not used for the traffic categorization, it may be less likely that Data Privacy regulations will be breached. In addition, since DPI may require dedicated hardware (e.g., which is not typically required for IPDR) the DNS-based enrichment approaches discussed herein may be less expensive. Furthermore, IPDR is an industry standard, is subscriber-aware, and may be less likely to affect network performance than DPI.

Of course, the above embodiments have been provided as examples only. It will be appreciated by those of ordinary skill in the art that various modifications, alternate configurations, and/or equivalents will be employed without departing from the spirit and scope of the invention. For example, although ZveloDB is stated to be a suitable database for traffic categorization, in other embodiments, a different database is selected and/or created.

The invention claimed is:

1. A system, comprising:
 a monitoring device to:
  monitor IP traffic in a network, the IP traffic comprising domain name system (DNS) transactions between a customer device and a DNS service; and
  receive data from the monitored DNS transactions, wherein the data comprises at least two of a domain name, an IP address, a customer ID, or a customer device ID; and
 a processing device to:
  build a data reference table based on the received data;
  enrich a data record associated with the data reference table using a domain name and an IP address for a remote service; and
  categorize the IP traffic using the enriched data record based on a dynamic traffic categorization technique that creates entries in the data reference table, the entries comprising at least one of the domain name, the extracted IP address, the customer ID, and the customer device ID.

2. The system of claim 1, wherein the customer device comprises at least one of a desktop, a laptop, a phone, a tablet, or a TV.

3. The system of claim 1, wherein the monitoring device is provided at a node in the network.

4. The system of claim 1, wherein the monitoring device comprises at least one of a modem, a router, a switch, a multiplexor, a firewall, or a cable modem termination system (CMTS).

5. The system of claim 1, further comprising:
 a collector subsystem to receive a stream of data records from the monitoring device, wherein:
  the processing device is part of the collector subsystem; and.
  the collector subsystem to transmit a stream of enriched data records to a traffic analyzer.

6. The system of claim 1, further comprising a database of domain names and corresponding service categories.

7. A method, comprising:
 monitoring IP traffic in a network, the IP traffic comprising domain name system (DNS) transactions between a customer device and a DNS service;
 receiving data from the monitored DNS transactions, wherein the data comprises at least two of a domain name, an IP address, a customer ID, or a customer device ID;
 building a data reference table based on the received data;
 enriching a data record associated with the data reference table using a domain name and an IP address for a remote service; and
 categorizing the IP traffic using the enriched data record based on a dynamic traffic categorization technique that creates entries in the data reference table, the entries comprising at least one of the domain name, the extracted IP address, the customer ID, and the customer device ID.

8. The method of claim 7, wherein the DNS transactions comprise DNS requests and responses.

9. The method of claim 8, further comprising:
updating the data reference table based on new DNS requests and responses that are received.

10. The method of claim 9, wherein updating the data reference table comprises purging stale entries.

11. The method of claim 7, wherein the data record comprises an IP detail record (IPDR).

12. The method of claim 7, wherein the data reference table further comprises data associated with other DNS transactions.

13. The method of claim 7, wherein the customer ID or the customer device ID comprises at least one of an International Mobile Subscriber Identity (IMSI) number, or an International Mobile Station :Equipment Identity (IMEI) number.

14. The method of claim 7, wherein the data further comprises at least one of a timestamp, or a time-to-live.

15. The method of claim 7, wherein the dynamic traffic categorization technique comprises:
determining a type of service delivered by the remote service to the customer device using the enriched data record.

16. The method of claim 7, wherein the dynamic traffic categorization technique comprises:
determining a service category based on the domain name in a database of service categories.

17. The method of claim 16, wherein the database of service categories is configurable by an administrator.

18. A non-transitory computer-readable storage medium having an executable stored thereon, which when executed instructs a processor to:
monitor IP traffic in a network, the IP traffic comprising domain name system (DNS) transactions between a customer device and a DNS service;
receive data from the monitored DNS transactions, wherein the data comprises at least two of a domain name, an IP address, a customer ID, or a customer device ID;
build a data reference table based on the received data;
enrich a data record associated with the data reference table using a domain name and an IP address for a remote service; and
categorize the IP traffic using the enriched data record based on a dynamic traffic categorization technique that creates entries in the data reference table, the entries comprising at least one of the domain name, the extracted IP address, the customer ID, and the customer device ID.

19. The non-transitory computer-readable storage medium of claim 18, wherein the dynamic traffic categorization technique comprises:
determining a type of service delivered by the remote service to the customer device using the enriched data record.

20. The non-transitory computer-readable storage medium of claim 18, wherein the dynamic traffic categorization technique comprises:
determining a service category based on the domain name in a database of service categories.

* * * * *